United States Patent [19]
Burnett et al.

[11] 3,899,052
[45] Aug. 12, 1975

[54] DISC BRAKE

[75] Inventors: Richard T. Burnett; James J. Colpaert, both of South Bend, Ind.

[73] Assignee: The Bendix Corporation, South Bend, Ind.

[22] Filed: May 20, 1974

[21] Appl. No.: 471,265

[52] U.S. Cl. .............................. 188/73.6; 188/73.4
[51] Int. Cl. ........................................... F16d 65/20
[58] Field of Search ........ 188/73.6, 73.4, 73.3, 72.4

[56] References Cited
UNITED STATES PATENTS

| | | | |
|---|---|---|---|
| 3,155,194 | 11/1964 | Gancel | 188/73.3 |
| 3,522,866 | 8/1970 | Habersack | 188/73.6 |
| 3,532,192 | 10/1970 | Falk | 188/73.4 |
| 3,545,575 | 12/1970 | Pinnhammer | 188/73.6 |
| 3,561,572 | 2/1971 | Flegl et al. | 188/73.6 |
| 3,580,362 | 5/1971 | Falk | 188/73.6 |

*Primary Examiner*—Trygve M. Blix
*Assistant Examiner*—Edward R. Kazenske
*Attorney, Agent, or Firm*—Ken C. Decker; William N. Antonis

[57] ABSTRACT

A disc brake is disclosed for use on an automotive vehicle. A disc brake includes a rotor having a pair of opposed friction faces, a fixed support member mounted adjacent one face of the rotor, a member slidably mounted on the fixed support member and straddling the rotor, and a pair of friction elements which are engaged by the straddling member to urge the friction elements into braking engagement with the friction faces of the rotor when a brake actuation is effected. A releasable clip is secured to the straddling member and extends through the friction elements to retain the latter on the straddling member. One of the friction elements is located in a recess on the support member, and a lost motion connection is provided between this friction element and the releasable clip to permit relative movement between this friction element and the clip along the face of the rotor so that this friction element may be placed in the recess of the support member before the straddling member is fastened to the support member.

5 Claims, 3 Drawing Figures

3,899,052

DISC BRAKE

BACKGROUND OF THE INVENTION

This invention relates to a disc brake for automotive vehicles.

Our invention provides a disc brake in which the straddling member which straddles the rotor is provided with an opening in the upper edge thereof so that the friction elements may be easily removed from the brake for servicing. A bent wire retainer extends through openings provided in the friction elements to fasten the friction elements to the straddling member. When servicing of the friction elements is required, the retainer can be easily removed, and the friction elements may be removed from the straddling member in a direction radially outwardly with respect to the rotor.

It is very desirable to be able to mount the brake on the vehicle with the friction elements already in place. Consequently, our invention provides a lost motion connection between one of the friction elements and the retainer, so that the one friction element can be placed in its recess in the stationary support member before the straddling member is secured to the support member.

SUMMARY OF THE INVENTION

Therefore, an important object of our invention is to provide a disc brake design in which the friction elements may be easily removed from the brake for servicing.

Another important object of our invention is to permit the disc brake to be mounted to the vehicle during vehicle assembly and the friction elements already mounted on the brake.

Still another important object of our invention is to provide a lost motion connection between one of the friction elements and the retainer which holds the friction element to the brake, so that the brake and one friction element may be removed relative to one another in a plane parallel to the face of the rotor during mounting of the brake on the vehicle.

Still another object of our invention is to provide a disc brake that is substantially lighter and, consequently, lower in cost then prior art disc brakes.

DETAILED DESCRIPTION

Figure 1:
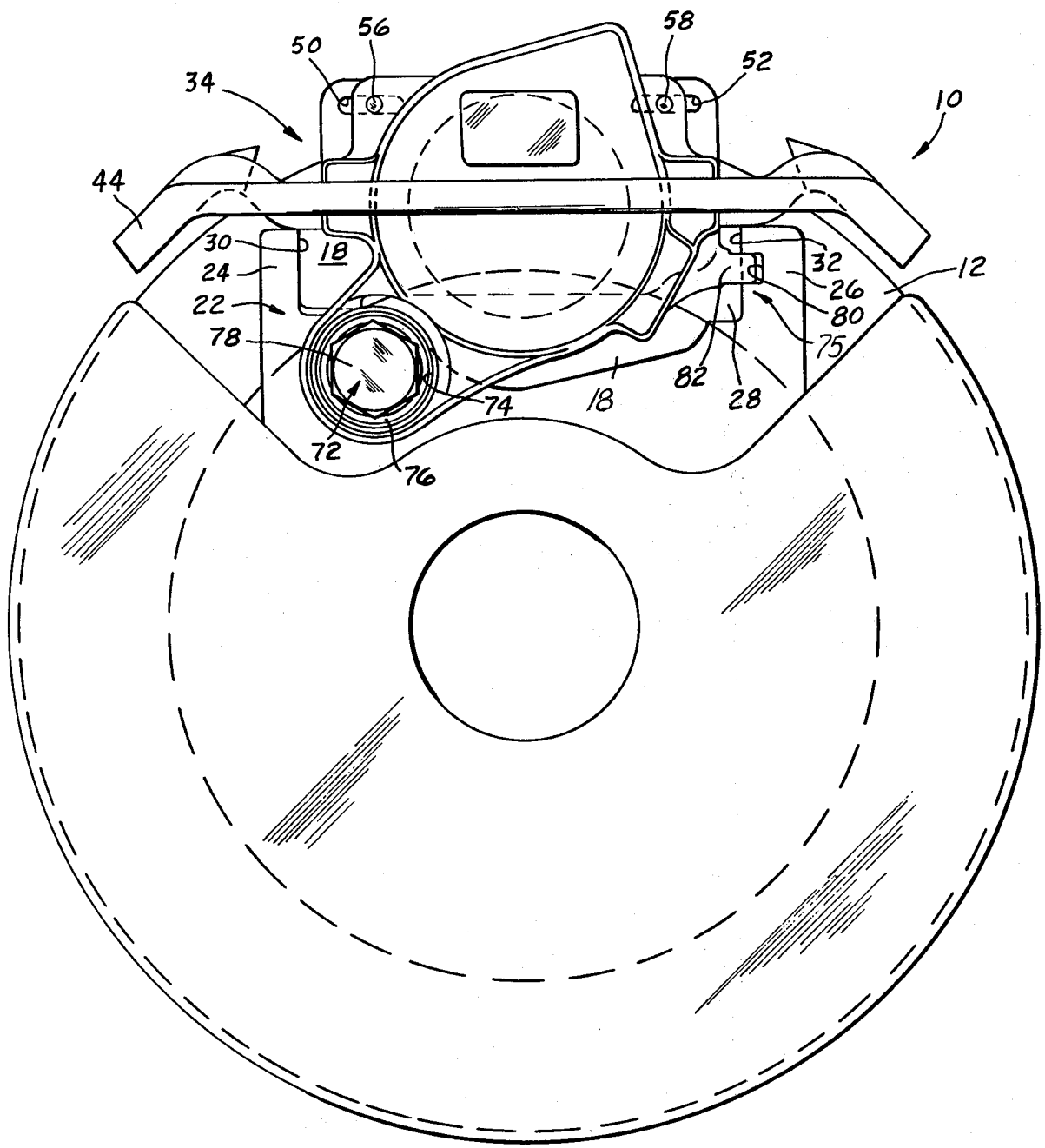
FIG. 1 is a side elevational view of the disc brake made pursuant to the teachings of our present invention.

Referring now to the drawings, the disc brake generally indicated by the numeral 10 includes a rotor 12 having a pair of friction faces 14 and 16. A pair of friction elements 18, 20 are mounted adjacent the friction faces 14 and 16 respectively, and are adapted to be urged into braking engagement with the friction faces 14, 16 when a brake actuation is effected. A fixed supporting member 22 is provided, which may be either bolted to a stationary portion of the vehicle adjacent the rotor 12 or may be made integral with some non-rotative vehicle component, such as the vehicle steering knuckle upon which the rotor 12 and the appropriate wheel (not shown) are rotatably mounted. The support member 22 includes a pair of spaced-apart arms 24, 26 which define a recess 28 therebetween in which the friction element 18 is carried. The facing edges 30, 32 of the arms 24 and 26 define bearing surfaces which cooperate with the corresponding surfaces on the edge of the friction element 18 to anchor the friction element 18 during braking. The upper edge (viewing the drawing) of the recess 28 is provided with an opening which is at least as wide as the friction element 18 so that the latter may be removed from the recess 28 in a direction radially outwardly with respect to the rotor when the friction element 18 is serviced.

The brake 10 further includes a member 34 which straddles the rotor 12 and which engages each of the friction elements 18, 20. The member 34 includes a housing 36 which defines a bore 38 therewithin which slidably receives a piston 40. The face of the piston 40 cooperates with the end of the bore 38 to define a fluid pressure chamber 42 therebetween which is communicated to any suitable source of fluid pressure during a brake actuation, such as the vehicle's master cylinder (not shown). The piston 40 also engages the friction element 18. The member 34 further includes a yoke 44 which is rigidly fastened to the housing 36 and which is attached to the friction element 20.

Friction element 20 is provided with apertures 46, 48 which are co-axial with apertures 50, 52 in the friction element 18. A releasable, bent wire clip 54 presents a pair of legs 56, 58 which extend over the periphery of the rotor 12. The leg 56 extends through the apertures 46 and 50, and the leg 58 extends through the apertures 48 and 52. A bridge portion 60 interconnects the legs 56, 58, and is provided with a loop 62 which is engaged by a bolt 64 to thereby fasten the clip 54 to the member 34 so that the friction elements 18, 20 are thereby releasably retained on the member 34. The housing 36 is provided with bores 66, 68 which receive the ends of the legs 56, 58 respectfully. An anti-rattle spring 70 interconnects the friction member 18 with the leg 58 to prevent the latter from rattling against the support member 22 when the brake is released.

The straddling member 34 is slidably mounted on the support member 22 for transverse movement with respect to rotor 12 by pin means generally indicated by the numeral 72 and a tongue and groove connection generally indicated by the numeral 74. The pin means 72 includes an annular opening 74 which extends through one side of the straddling member 34 and which slidably engages an annular sleeve 76. The sleeve 76 is bolted to the support member 22 by a bolt 78 which extends through the sleeve 76 to threadedly engage the support member 22. Consequently, a sliding connection is provided between the opening 74 and the sleeve 76 to permit the straddling member 34 to move axially with respect to the rotor. To prevent rotation about the pin means 72, the tongue and groove connection 75 includes a groove 80 in the bearing surface 32 which receives a tongue 82 which projects from the housing 36. It will be noted that the length of the tongue 82 which is received within the groove 80 is substantially smaller then the width of the oversized slots 50, 52 in the friction element 18 through which the legs 56, 58 project. Consequently, when the brake is mounted on the vehicle, the straddling member 34 is first located in its approximate position over the rotor 12. Thereafter, the friction element 18 is moved along the friction face 14 relative to the straddling member 34 and to the rotor 12 to locate the friction element 18 in the recess 28. Thereafter, the straddling member 34 is moved relative to the friction element 18 and also to the rotor 12 to locate the tongue 82 in the groove 80. The bolt 72 can then be used to fasten the sleeve, which has already been inserted in the opening 74, to the torque member 22. It should be noted that if the slots 50, 52 were only slightly greater than the diameter of the legs 56 and 58, as is the case in the prior art brakes, the brakes could not be mounted on the support member 22 with the friction element 52 in place, since after the friction element 18 is placed in the groove 28, the straddling member 34 could not be moved relative to the support member 22 to engage the tongue 82 with the groove 80. Because of the lost motion connection between the legs 56, 58, it is possible to mount the friction elements 18, 20 on the brake before the brake is mounted on the vehicle and to replace the friction element 18 after the brake is mounted on the vehicle.

Figure 2:
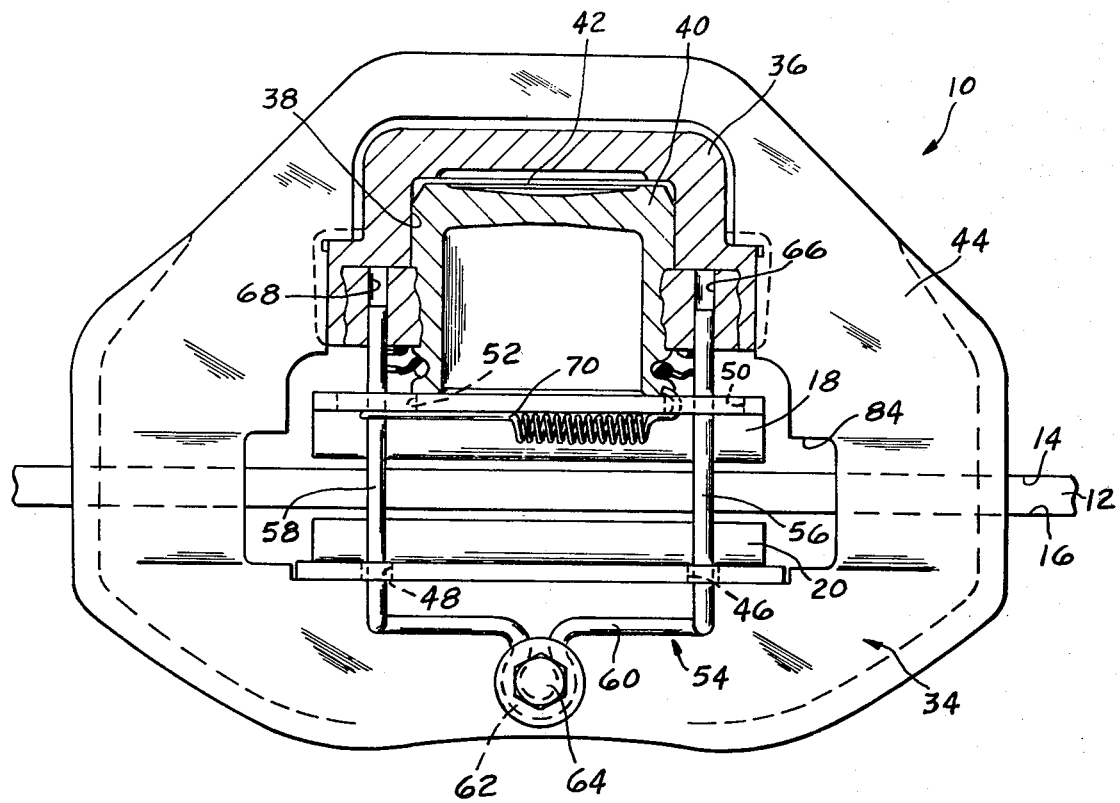
FIG. 2 is a top plan view of the brake illustrated in FIG. 1 with the fluid motor portion of the latter illustrated in cross section.
Figure 3:
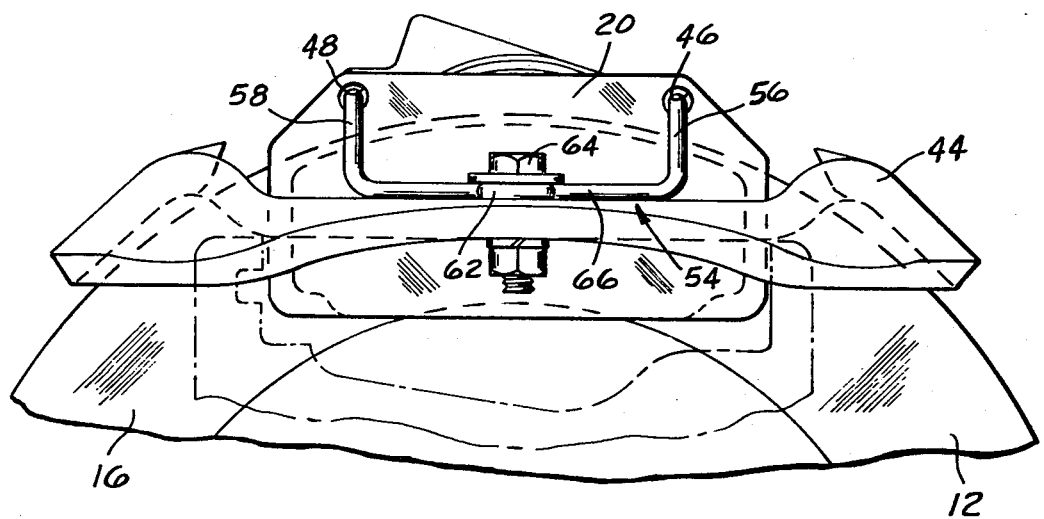
FIG. 3 is a side elevational view of the disc brake illustrated in FIGS. 1 and 2 but which illustrates the side of the brake opposite the side illustrated in FIG. 1.

In operation, the brake 10 functions in the same manner as does any conventional disc brake. Fluid pressure generated in the vehicle's master cylinder during a brake actuation is communicated to the chamber 42 where it reacts on the rear face of the piston 40, driving the latter downwardly viewing FIG. 2 to urge the friction element 18 into braking engagement with friction face 14. Because of the slidable connection between the straddling member 34 and support member 22, reaction forces acting through the yoke 44 also urge the friction element 20 into braking engagement with the friction face 16, thereby effecting a brake actuation. When repeated brake actuations have worn the friction elements 18, 20 enough to require their replacement, servicing of the brake may be accomplished easily without removing the straddling member 34 from the support member 22. When servicing is necessary, the bolt 64 and clip 54 are removed, permitting the friction elements 18, 20 to be removed radially outwardly with respect to the rotor through the opening 84 in yoke 44 provided for this purpose. Of course, new friction elements are inserted into the brake in the same manner, and the clip 54 and bolt 64 are thereafter replaced.

We claim:

1. In a disc brake, a rotor having a pair of friction faces, a pair of friction elements, one of said elements being disposed adjacent each of said friction faces, a member straddling said rotor and engaging each of said friction elements for urging each of the latter into braking engagement with their corresponding friction faces when a brake application is effected, a fixed support member, means slidably mounting said straddling member on the support member for transverse relative movement with respect to the rotor, said straddling member having an opening exposing the edge of each of said friction elements whereby the latter may be removed from the straddling member in a direction radially outwardly with respect to the rotor, releasable means engaging each of said friction elements to retain them on the straddling member, said support member defining a recess, one of said friction elements being received within said recess, and a lost motion connection between said one friction element and said releasable means so that relative movement is permitted between the one friction element and the straddling member without release of the releasable means;

said slidably mounting means including a groove in one of said members and a tongue projecting from the other member and received in said groove;

said releasable means including first pin means, said lost motion connection including an elongated opening in said one friction element receiving said pin means, the width of said opening being wider than the length of said tongue received within said groove.

2. The invention of claim 1,
said pin means being a bent wire clip having a pair of legs defining said pin means and a bridge portion connecting said legs, said legs extending through openings in each of said friction elements, and removable fastening means securing said bridge portion to said straddling member.

3. The invention of claim 1,
said slidably mounting means further including pin means secured to said support member and slidably received by said straddling member, said tongue and groove connection preventing rotation of said straddling member about said pin.

4. In a disc brake, a rotor having a pair of friction faces, a pair of friction elements, one of said elements being disposed adjacent each of said friction faces, a member straddling said rotor and engaging each of said friction elements for urging each of the latter into braking engagement with their corresponding friction faces when a brake application is effected, a fixed support member, means slidably mounting said straddling member on the support member for transverse relative movement with respect to the rotor, said straddling member having an opening exposing the edge of each of said friction elements whereby the latter may be removed from the straddling member in a direction radially outwardly with respect to the rotor, releasable means engaging each of said friction elements to retain them on the straddling member, said support member defining a recess, one of said friction elements being received within said recess, and a lost motion connection between said one friction element and said releasable means so that relative movement is permitted between the one friction element and the straddling member without release of the releasable means;

said support member including a pair of arms defining said recess therebetween for receiving said one friction element, the facing edges of said arms defining bearing surfaces cooperating with bearing surfaces on the edges of said one friction element to anchor said one friction element when a brake application is effected, the upper edge of said recess having an opening at least as long as the length of the widest part of said one friction element to permit removal of said friction element from said recess through said opening radially outwardly with respect to said rotor;

said slidably mounting means including a groove in the side of one of said arms facing into said recess and a tongue projecting from said straddling member and received within said groove;

said releasable means including first pin means, said lost motion connection including an elongated opening in said one friction element receiving said pin means, the length of said slot being wider than the length of said tongue received within said groove.

5. The invention of claim 4,
said slidably mounting means further including pin means secured to said support member and slidably received by said straddling member, said tongue and groove connection preventing rotation of said straddling member about said pin.

* * * * *